Oct. 11, 1927.
J. F. WHITE
1,645,467
TRAILER
Filed Nov. 19, 1925
2 Sheets-Sheet 1
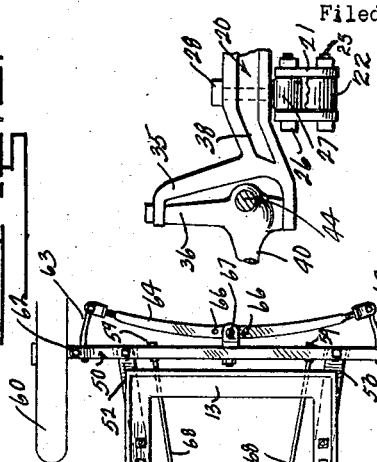
Fig. 2.
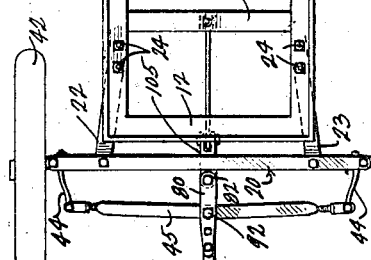
Fig. 1.
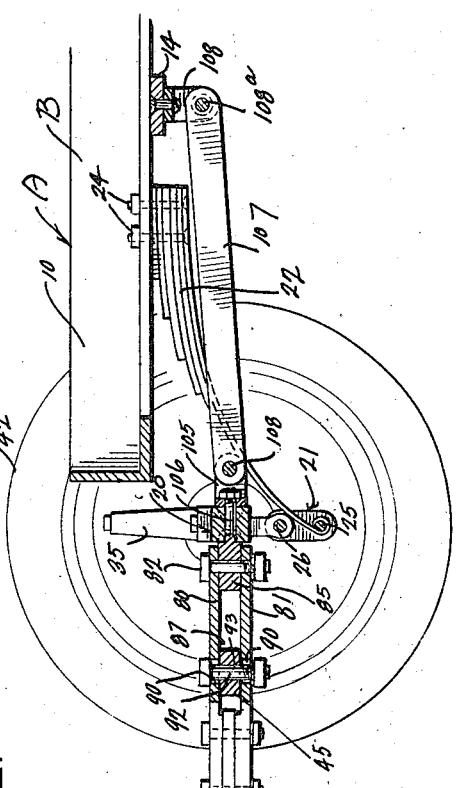
James F. White
Inventor
By Lancaster and Allwine
Attorneys Oct. 11, 1927.                     1,645,467
J. F. WHITE
TRAILER
Filed Nov. 19, 1925          2 Sheets-Sheet 2
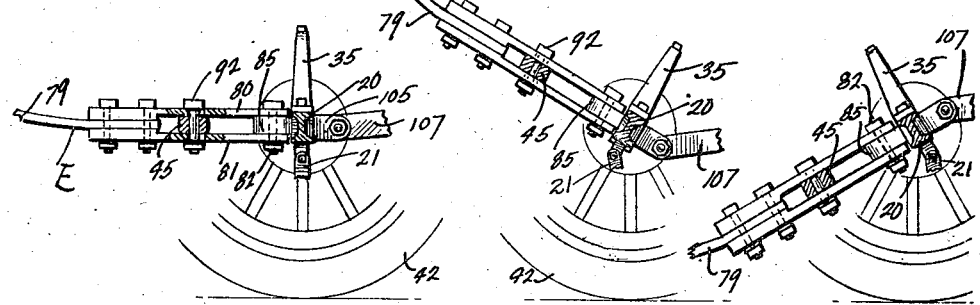
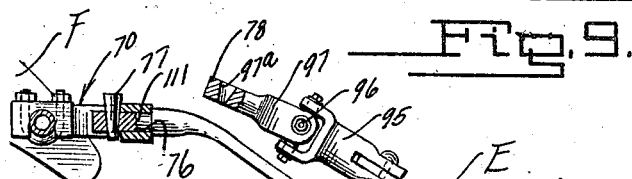
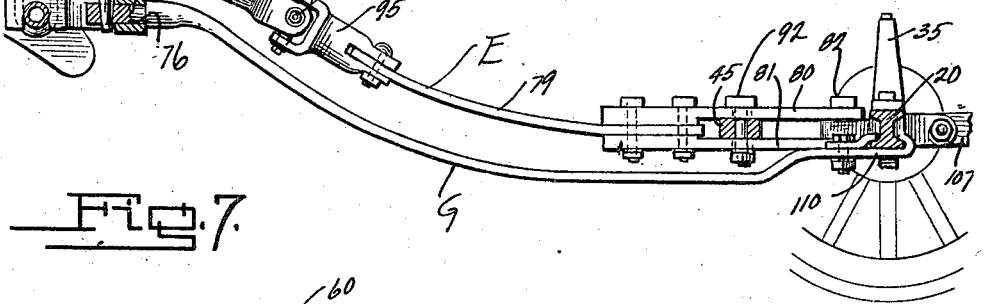
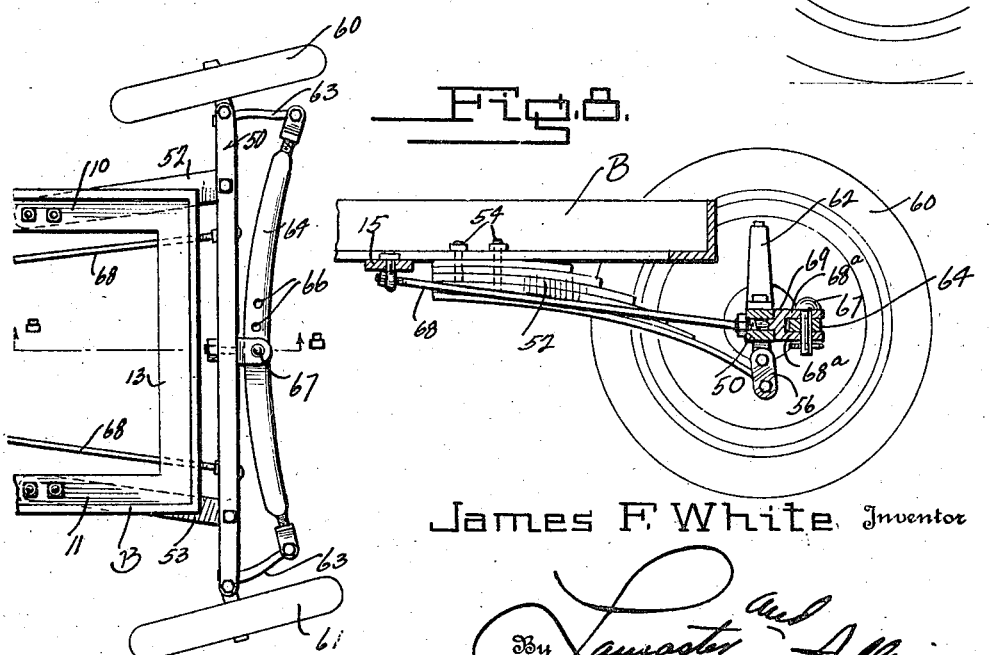
James F. White, Inventor Patented Oct. 11, 1927.

1,645,467

UNITED STATES PATENT OFFICE.

JAMES F. WHITE, OF INDIANAPOLIS, INDIANA.

TRAILER.

Application filed November 19, 1925. Serial No. 70,148.

This invention relates to improvements in vehicle constructions and is particularly directed to the provision of an improved trailer.

The primary object of this invention is the provision of an improved trailer, which while adaptable for a variety of trailer uses, is particularly well constructed for use by tourists, in that the same may be conveniently attached to the rear of the conventional automobile, and afford an easy riding vehicle, which will not interfere with the easy riding qualities of the automobile, and which readily conforms to irregularities in the road surface over which the automobile and trailer are being propelled.

A further object of this invention is the provision of an improved trailer having a novel type of oscillating front axle.

A further object of this invention is the provision of an improved automobile trailer which embodies a novel type of front axle and spring connection.

A further object of this invention is the provision of novel steering mechanism for the front axles of trailers.

A further object of this invention is the provision of a novel type of axle connected spring suspension for vehicles, and particularly trailers.

A further object of this invention is the provision of a novel axle construction embodying a novel construction for transmitting forces direct from a draw bar to the chassis frame.

A further object of this invention is the provision of a novel draw bar universal joint connection for trailers.

A further object of this invention is the provision of novel means for steering a trailer when "backing up" or reversing.

Other objects and advantages of this invention will be apparent during the course of the following detailed description.

In the accompanying drawings, forming a part of this specification, and wherein similar reference characters designate corresponding parts throughout the several views, Figure 1 is a plan view of the improved trailer, showing its novel connection with the rear end of a conventional automobile chassis.

Figure 2 is a fragmentary longitudinal sectional view taken through the front end of the improved trailer, showing novel constructional features thereof, and the novel draw bar connection which the same has with the rear end of the automobile adapted to pull the trailer.

Figure 3 is a fragmentary end view of a novel type of front axle and steering wheel connection for the trailer.

Figures 4, 5 and 6 are views in section, showing the different positions which the front axle of the trailer may assume, to insure easy riding of the trailer.

Figure 7 is a fragmentary plan view of the rear end of the trailer, showing the novel means to which the same may be adjustably positioned for steering.

Figure 8 is a sectional view taken substantially on the line 8—8 of Figure 7.

Figure 9 is a fragmentary view, partly in section, showing a novel type of push bar which may be substituted for the usual connection when it is desired to back up the trailer, the usual draw bar connection then being used to accomplish the steering of the trailer.

In the drawings, wherein for the purpose of illustration is shown a preferred embodiment of this invention, the letter A may generally designate the trailer, which may comprise a frame B; front running gear C; rear running gear D; and means E for connecting the trailer to the propelling automobile F. A novel push bar G may be used in lieu of the means E, when "backing up," and the connecting means E then being used to accomplish the steering of the trailer, as will be subsequently set forth.

The frame B may of course be of any approved construction, and is preferably of the rigid steel type, including the longitudinal side rails 10 and 11, and the front and rear end rails 12 and 13 respectively. Intermediate cross beams 14 and 15 may connect the side rails 10 and 11, as in conventional chassis frame construction, and these cross beams 14 and 15 may be utilized for the purpose of connecting reinforcing portions of the steering gear thereto, as will be subsequently mentioned.

Referring to the front running gear C, the same is provided with an eye beam type of axle 20, connected by shackles 21 with the lower forward ends of cantilever or quarter-elliptic springs 22 and 23. The springs 22 and 23 are connected at their rear ends by bolt means 24 to the frame rails 10 and 11 respectively, and extend forwardly slightly in diverging relation, and the lower leaves thereof at the lower forward ends are provided with shackles or links of any approved construction, which extend upwardly from their pivotal connecting bolts 25 with said springs 22 and 23, and at their upper ends each of the same has a pivot bolt 26 extended through the horizontally apertured lower end 27 of members 28 which may be connected to the axle 20, as is illustrated in Figure 3 of the drawings.

The axle 20 as above mentioned is of I-cross section, and at the ends thereof the same is provided with yokes 35 adapted to receive therein, in oscillative connected manner, conventional steering knuckles 36. The yokes 35 have connection with the main body portion of the axle 20, by dropping the ends of the axle 20 downwardly, at 38, adjacent the yokes 35, in order that the wheel receiving spindles 40 of the steering knuckles 30 may be positioned as low as possible, in preferable alignment with the longitudinal axis of the axle 20, and as close as possible to the axle of the pivot bolts 26. This is provided for the reason that the axle 20 is bodily oscillative on a horizontal axis, the movement being on the shackle bolts 26 as pivot axes, and in order to obviate a too eccentric movement of the trailer bed during the oscillation of the axle on the bolts 26, it can readily be understood that the axes of the spindles 40 should be as close as possible, and even preferably co-axial with the axes of the bolts 26.

Front steering wheels 42 and 43 are rotatable on the spindles 40 of the steering knuckles 36 at the ends of the axle 20, and the steering knuckles 36 are provided with steering arms 44 preferably extending forwardly, and pivotally connected at their outer ends by means of a tie bar 45.

Referring to the rear running gear D, the same comprises an I-beam type of axle 50, preferably of identical construction with the axle 20, and the description above given for the steering knuckle connections and construction for the axle 20 holds good for the rear steering gear axle 50. The rear axle 50 is mounted by means of cantilever or quarter-elliptic springs 52 and 53, which are connected at their front ends at 54 to the chassis rails 10 and 11 respectively, and extend rearwardly slightly divergent for connection by means of shackles 56 with the rear axle 50 in manner similar to that above described for the axle 20. The rear axle 50, however, instead of being of the oscillative type is held stationary by means of tie rods 68, which at their forward ends are connected to the intermediate cross beam 15 of the frame B, and at their rear ends having a bolted connection at 59 with the axle 50, to prevent the same from horizontally turning.

Steering wheels 60 and 61 are connected by suitable knuckles 62 with the yokes of the axle 20, and these steering knuckles 62 include rearwardly extending steering arms 63, the ends of which are pivoted to a concavo-convex shaped tie rod 64. The tie rod 64 intermediate its ends is provided with a series of openings 66, adapted to receive a pin 67 therein; the pin 67 being detachably supported by the spaced arms 68ª of a bracket 69 which is detachably supported by the axle 50, as illustrated in Figures 1, 7 and 8 of the drawings. Normally, the pin 67 will rest in the central opening 66, and hold the wheels 60 and 61 parallel with the longitudinal axis of the trailer A, for ordinary traveling. However, in addition to the front steering wheels, it is desired to make the rear wheels or running gear dirigible, as a convenience when backing or reversing, in order that the trailer may move in the proper direction. Thus, when it is desired to cant the wheels 60 and 61 with respect to the axis of the frame B, it is merely necessary to detach the pin 67 and shift the tie bar 64 along the space between the arms 68ª of the bracket 69, until the proper opening 66 aligns with the opening of the arms 68ª, and the pin 67 is then dropped into position and the wheels 60 and 61 will be held in their proper canted relation, to effect the reversed steering of the vehicle in the proper direction, out of normal longitudinal path of travel of the trailer.

Referring to the means E by which the trailer at its front running gear is connected with the vehicle F, the latter vehicle is of course provided with a conventional chassis frame 10ª, of which the rear cross beam 11ª is a part. Parallel with the beam 11ª, and to the rear thereof is a cross coupling bar 12ª, in spaced relation with the chassis rail 11ª.

A draw bar bracket 70 is connected to the chassis rail 11ª, and coupling bar 12ª, including a body portion 71 bolted at 72 to the bar 12ª, and having forwardly extending divergent brace rods 73 connected to the chassis rail 11ª. Integral with the body 71 the bracket 70 is provided with a rearwardly extending U-shaped connecting extension 74, having a vertical opening 75 therein and having a horizontal opening 76 in the rear thereof, adapted to detachably receive the shank 78 of the draw bar construction of the trailer A, as will be subsequently described.

Referring to the draw bar construction E of the trailer A, the same includes a tongue or draw bar 79, which at the rear end thereof is bifurcated, providing the rearwardly extending spaced bar portions 80 and 81, which at their rear ends are connected by a pintle or bolt 82 with a detachable lug 85 which may be carried by the front oscillative axle 20, between the ends thereof. The bar 79 has the bifurcated portions 80 and 81 thereof of sufficient length that the tie bar 45 of the front steering gear extends transversely thru the space 87 between said draw bar portions 80 and 81, and said portions are provided with longitudinally extending elongated openings 90, adapted to detachably receive a pintle or pin 92 which is also adapted to slip thru an aperture 93 provided intermediate the ends of the tie bar 45, in order to connect the tie bar 45 with the draw bar 79 for movement, to effect the steering of the wheels 42 and 43.

A very important feature of this invention is the provision of a universal joint at the front end of the draw bar 79, and immediately adjacent the bracket 70, and to this end the draw bar 79 at its front end is provided with a universal joint part 95, universally swiveled at 96 to the universal joint part 97 of which the shank 78 is a part. To effect the attachment of the joint shank 78, it is merely necessary to insert the same in the opening or socket 76 of the bracket 70, and this positions the inner end of the shank 78 in alignment with the opening 75 of the bracket 70, so that a tapered opening 97$^a$ thru the shank 78 aligns with the opening 75, and a tapered pin 100 may be slipped into the shank opening 97$^a$ to prevent detachment of the joint part 97 from the draw bar bracket 70, as is illustrated in Figure 2 of the drawings.

Bearing in mind that the axle 20 is oscillative about a horizontal axis, and that the same is connected adjacent its ends to the springs 22 and 23, it can readily be seen that it is important to transmit the forces incident to pull, to the frame B, other than thru the springs 22 and 23. To this end, as is illustrated in Figures 1 and 2 of the drawings, a U-shaped bracket 105 is connected at the rear of the axle 20 directly to the pin 106 which connects the draw bar connecting lug 85, and to this U-shaped bracket 105 is swively connected a bar or rod 107, as by a pin 108; the bar 107 preferably extending along the axis of the frame B rearwardly to adjacent the first cross brace 14, and there being pivotally connected at 108$^a$ by a bracket 108 with said cross brace 14. From this construction it is readily obvious that upon pulling upon the draw bar 79, the pull will be transmitted to the axle 20 and then directly to the bar or rod 107 and into the frame B at the cross brace 14; the axle 20 being free to oscillate vertically on a horizontal axis.

From the foregoing it is apparent that the trailer embodies a novel construction which enables the same to ride easily, and without undue strain upon itself or upon the propelling vehicle, due primarily to the novel construction of the front running gear C, which has an axle which oscillates vertically upon a horizontal axis, the axis of the axle substantially being always at right angles to the axis of the trailer, due to the two spring connections and the connecting rod connection 105. This movement of the front axle 20 enables the trailer to assume a natural position upon the ground independent of the lower or elevated position of the front propelling vehicle F. In addition to these features the front running gear C is dirigible, and the steering is automatic by reason of the draw bar connection E. It is to be noted that the pin 92 may move in the elongated openings 90 of the draw bar, to enable the side swing of the draw bar. The universal joint of the draw bar is important, since thereby the plane of the trailer may be canted out of the plane of the front propelling vehicle, without torsion upon the draw bar and chassis parts of the trailer and propelling vehicle.

The difficulty of backing up a trailer, having a pivoted draw bar connection with the propelling vehicle, is well understood. Therefore I contemplate the provision of a special push bar G, which is longer than the draw bar construction E including the universal joint. This push bar G at its rear end has a clamping connection at 110 with the axle 20, preferably to one side of the draw bar connection. The push bar G extends forwardly and at its front end has an attaching shank 111 of a size suitable for fitting into the socket or opening 76 of the bracket 70, and it is provided with a wedge pin 77 which clamps the front end of the push bar G rigidly with the draw bar bracket 70. This push bar G is thus connected rigidly to the rear end of the propelling vehicle F and to the front axle 20 of the trailer A, rigidly holding the latter against its normal vertical oscillatory movement. The draw bar 79 and universal joint forwardly thereof may now act as a steering rod or tongue, and upon "backing up" of the vehicle F, the operator may swing the draw bar 79 from side to side to position the steering wheels 42 and 43 properly for backing up the trailer A in the desired direction, as can be readily understood.

In Figures 4, 5 and 6 has been illustrated the positions which the front axle 20 may assume with respect to the normal horizontal plane of positioning of the trailer, and clearly designates the important advantage secured by the improved trailer, in that the same may move at a lower plane of elevation than the plane of the propelling vehicle, or vice versa, without imposing any strain upon the propelling or trailer vehicle parts.

Various changes in the shape, size, and arrangement of parts may be made to the form of invention herein shown and described, without departing from the spirit of the same or the scope of the claims.

I claim:

1. In a trailer or other vehicle the combination of a frame, suspension springs connected with the frame, and running gear connected with said suspension springs including a front axle oscillatively connected to a pair of suspension springs at opposite sides of the frame to permit the oscillation of the axle substantially about its own axis.

2. In a trailer the combination of a frame, rear running gear for the frame, front quarter-elliptic springs for the frame at each side thereof, an axle, shackles pivotally connected to the axle and pivoted to the front ends of said quarter elliptic springs in spaced relation to the axle pivots thereof, and steering supporting wheels for said axle.

3. In a vehicle chassis the combination of a frame, rear running gear for the frame, and front running gear for the frame including an axle, supporting wheels, steering knuckles including spindles for supporting said wheels, and means pivotally connecting the axle to the frame so that it may swing substantially on a horizontal axis, the horizontal axis on which said axle swings being closely adjacent to a co-axial position with the spindle axes of the wheels and said axle axis.

4. In a vehicle chassis the combination of a frame, shock absorbing springs for the frame, an axle means pivotally connecting the axle below the same with the forward ends of said springs, the ends of the axle outwardly of said springs being downwardly dropped, supporting wheels, and steering knuckles including spindles for the supporting wheels connected with said axle at the free ends of the dropped ends of the axle whereby to position the spindle axes closely to the pivotal axis of the axle.

5. In a vehicle chassis the combination of a frame, rear running gear for the frame, front leaf springs for the frame, and front running gear for the frame including an axle, shackles pivotally connecting the axle to the front ends of the leaf springs so that the axle may oscillate on a substantially horizontal axis, steering wheels, and steering knuckles carried at the outer ends of said axle including spindles for receiving said steering wheels, the ends of said axle adjacent the steering knuckles outwardly of the pivotal connection of the axle with the springs being downwardly dropped, so as to position the axes of the spindles closely in alignment with the axis of oscillation of the axle.

6. In a chassis the combination of a frame, rear running gear for the frame, front leaf springs for the frame connected at each side thereof, an axle, pivot means connecting the axle to the forward ends of said springs so that the axle may oscillate substantially on a horizontal axis, supporting wheels for the axle, a draw bar connected with the axle, and a connecting link pivotally connected with the axle and with the frame so that forces upon the draw bar and axle will be directly transmitted through the connecting link to the frame independent of transmission of said forces to the springs.

7. In a vehicle chassis the combination of a frame, rear running gear for the frame, front leaf springs connected at each side of the frame and extending forwardly thereof, a front axle, shackles pivotally connecting the axle therebelow at spaced points with the front ends of said springs to permit the axle to bodily swing, steering wheels at the other ends of the axle, a tie rod connecting said steering wheels for dirigible action, and a draw bar pivotally connected with the axle and with the tie rod.

8. In a vehicle chassis the combination of a frame, rear running gear for the frame, front leaf springs connected at each side of the frame and extending forwardly thereof, a front axle, shackles pivotally connecting the axle therebelow at spaced points with the front ends of said springs to permit the axle to bodily swing, steering wheels at the outer ends of the axle, a tie rod connecting said steering wheels for dirigible action, a draw bar pivotally connected with the axle and with the tie rod, and means pivotally connecting the axle directly with the frame for transmission of forces direct from the axle to the frame independent of the springs.

9. In a chassis the combination of a frame, rear running gear for the frame, front springs connected with the frame and extending forwardly from their connection with the frame, an axle, means pivotally connecting the axle with the front ends of said springs to permit the oscillation of the axle on substantially a horizontal axis and preventing side swing of the axle, steering wheels connected at the outer ends of the axle, a tie bar guiding the action of the steering wheels, said tie rod being located forwardly of said axle, a draw bar pivotally connected with the axle between its ends and pivotally connected with the tie bar for movement thereof upon movement of the draw bar, a connecting link, and means pivotally connecting the connecting link with the axle adjacent the draw bar connection and with the chassis frame for direct transmission of forces thru the draw bar into the chassis frame independent of said front springs.

10. In a trailer the combination of a frame, running gear for the frame including a front axle, supporting wheels for the axle, and means pivotally connecting the axle to the frame to permit its swinging about a substantially horizontal axis arranged transversely of the frame, a draw bar, means connecting the draw bar to the axle, and a universal joint mounted at the outer end of said draw bar including a part for connection to a towing vehicle.

11. In a trailer construction the combination of a frame, running gear for the frame including a front axle, steering wheels supported by the front axle, and means connecting the axle to the frame to permit its bodily oscillation forwardly and rearwardly of the vehicle on an axis lying longitudinally within the axle itself, a draw bar pivotally connected with said axle for movement in a vertical plane to oscillate the axle on said axis above mentioned, and a universal joint connected at the outer end of said draw bar including a part connected with the draw bar and a part for connection with the towing vehicle.

12. In a trailer construction the combination of a frame, running gear for the frame including a front axle, steering wheels supported by the front axle, means connecting the axle to the frame to permit its bodily oscillation forwardly and rearwardly of the vehicle on an axis lying longitudinally within the axle itself, a draw bar pivotally connected with said axle for movement in a vertical plane to oscillate the axle on said axis above mentioned, a universal joint connected at the outer end of said draw bar including a part connected with the draw bar and a part for connection with the towing vehicle, and means connecting the steering wheels of the axle with the draw bar to permit the steering wheels to be moved upon lateral movement of the draw bar for steering the frame.

13. In a trailer the combination of a frame, running gear for the frame including a front axle, supporting wheels for the front axle, springs for the frame, means connecting said springs with the axle in a pivoted relation to one side of the axis of the axle, means pivotally connecting the axle with the frame to permit the axle to bodily move in oscillative manner on a horizontal axis arranged transversely of the frame, and which axis passes longitudinally thru the axle itself, a draw bar, means pivotally connecting the draw bar to the axle to move the axle in pivotal manner on said axis when the draw bar is vertically moved, said means permitting lateral pivotal movement of the draw bar with respect to the axle, and a universal joint connected at the outer end of the draw bar including a part connected with the draw bar, and a second part for connection with a towing vehicle.

14. In a vehicle of the class described the combination of a frame, rear running gear for the frame, front substantially elliptic shaped leaf springs for the frame at each side of the frame extending at their free ends forwardly of the frame and beneath the same, a front axle transversely positioned with respect to the frame below the frame, shackles pivoted at their upper ends at the bottom of the axle towards the ends of the axle, said springs at their free forward ends being pivoted to the extreme lower ends of said shackles below the pivot axes of said shackles on the axle, and steering supporting wheels at the ends of said axle.

JAMES F. WHITE.